March 18, 1958  I. T. DOWNS  2,827,241
CLOD ELIMINATOR FOR ATTACHMENT TO A POTATO HARVESTER
Filed Nov. 30, 1953  2 Sheets-Sheet 1
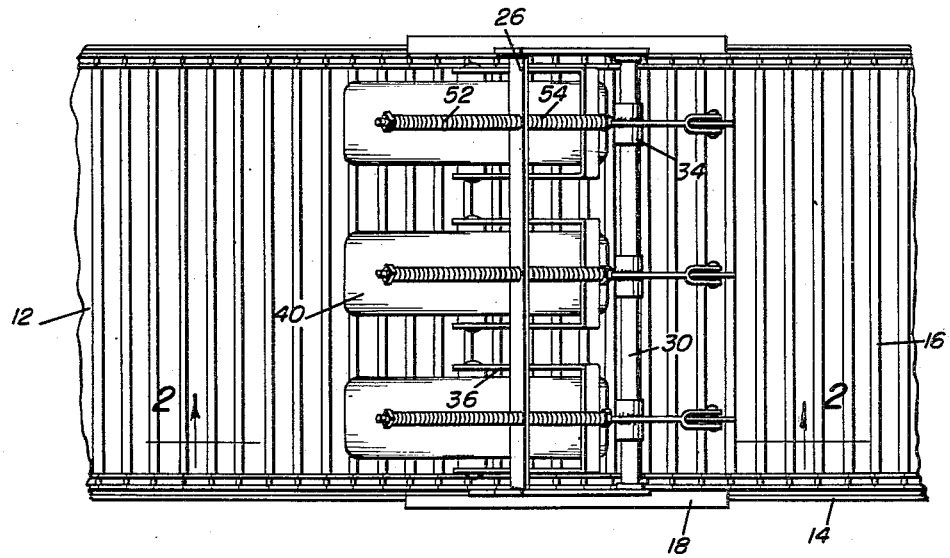
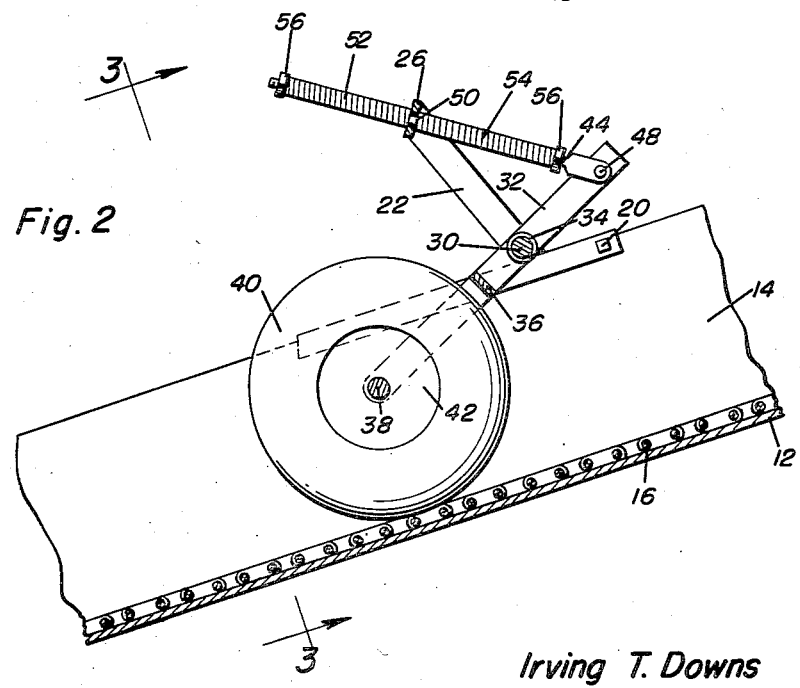
Irving T. Downs
INVENTOR.

March 18, 1958 I. T. DOWNS 2,827,241
CLOD ELIMINATOR FOR ATTACHMENT TO A POTATO HARVESTER
Filed Nov. 30, 1953 2 Sheets-Sheet 2

Irving T. Downs
INVENTOR.

2,827,241

CLOD ELIMINATOR FOR ATTACHMENT TO A POTATO HARVESTER

Irving T. Downs, Riverhead, N. Y.

Application November 30, 1953, Serial No. 395,171

3 Claims. (Cl. 241—102)

This invention relates to a clod eliminator and specifically provides an improved device for attachment to potato harvesting machines, such as potato diggers or potato harvesters.

In the operation of potato harvesting machines particularly where the earth forms large clods, difficulty is encountered in breaking and removing the earth clods in that portion of the machine where the potatoes are separated from the vines and discharged to the sacking station. As is well known, the potatoes are carried on conveyors of the screen mesh type wherein the earth is shaken through the screen conveyors for the purpose of separating the earth from the potatoes. However, in some instances the clods do not break easily and sometimes the clods are sacked along with the potatoes.

The primary object of this invention is to provide a clod eliminator for breaking up the earth clods on the conveyor of a potato harvesting machine whereby the earth can be effectively separated from the potatoes so that only potatoes are delivered to the sacking station.

Another object of this invention is to provide a clod eliminator including a plurality of resiliently mounted crushing rollers or the like in contact with the conveyor wherein clods may be effectively broken up thereby delivering the potatoes from the conveyor in a thoroughly cleaned condition.

A further object of this invention is to provide a clod eliminator having a resiliently mounted clod crushing roller and means for adjusting the relationship of the roller and the conveyor depending upon the various operating conditions and the nature of the soil.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a top plan view of the clod eliminator of this invention mounted upon the conveyor of a potato harvesting machine;

Figure 2 is a longitudinal, vertical section taken substantially along section line 2—2 of Figure 1 showing the details of construction of the clod eliminator;

Figure 3:
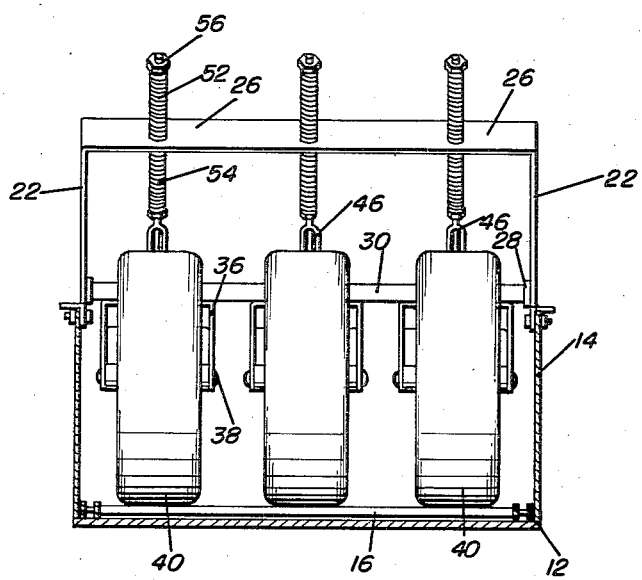
Figure 3 is a transverse, vertical section taken substantially along section line 3—3 of Figure 2 showing the relationship of the conveyor and the clod eliminator of this invention.
Figure 4:
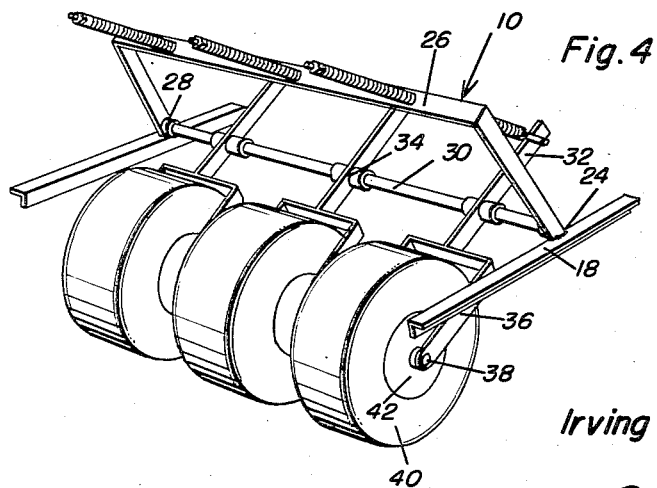
Figure 4 is a perspective view of the clod eliminator attachment removed from the potato harvesting machine.

Referring now specifically to the drawings, it will be seen that the numeral 10 generally designates the clod eliminator of this invention for use in conjunction with a potato harvester having a trough member 12 having upstanding side walls 14 and an endless conveyor 16 movable along the trough 12 for transporting the potatoes, potato vines and the accompanying earth clods along the trough 12.

The clod eliminator 10 includes a pair of oppositely facing angle irons 18 adapted to engage the upper edges of the side walls 14 and secured thereto by fastening members 20 which secure the vertical portion of the angle irons 18 to the side walls 14. An upstanding strap member 22 is secured to the upper surface of each angle member 18 by welding 24 or other suitable means. The upper ends of the upstanding straps members 22 are connected by a transverse bar 26. Adjacent the lower end of the upstanding members 22 and on the inner surface thereof is a socket member 28 for receiving a transverse rod 30 therein. The rod 30 is in spaced vertical parallel relation to the bar 26. A plurality of elongated bracket members 32 have a tubular sleeve 34 positioned adjacent the midpoint thereof and surrounding the rod 30 wherein the brackets 32 are pivotally secured to the shaft or rod 30. One end of each of the brackets 32 is provided with a U-shaped member 36 for receiving an axle 38 between the free end portions of the leg members of the U-shaped member 36. A wheel member 40 including a rim 42 is journaled on the axle 38 and the wheel 40 is provided with a pneumatic tire or other relatively soft material. Further, the tire is provided with a relatively wide outer surface wherein the wheel 40 forms a clod engaging and breaking member. As shown in Figure 3, the collective tread width of wheels 40 covers a major portion of the transverse width of the conveyor. In the specific embodiment illustrated, it is seen that there are three brackets 32 and the related structure of the wheel 40, however, it will be understood that any number of these individually operated assemblies may be utilized. At an end remote from the U-shaped member 36 the bracket 32 is provided with an aperture for pivotally receiving an elongated rod 44 having a U-shaped end member 46 straddling the end of the bracket 32 and pivotally secured thereto by a pivot pin 48. The transverse bar 26 is provided with a plurality of transversely spaced apertures 50 which are in alignment with the brackets 32 and slidably receive the elongated rod 44. A spring 52 is positioned on the outer end of the rod 44 and engages one side of the bar 26 and a coil spring 54 is positioned around the inner end of the rod 44 and engages the other surface of the bar 26. Adjustable screw threaded nuts 56 are then threaded onto the elongated bar 44 at opposite ends thereof for adjusting the tension of the springs 52 and 54. It will be seen that the wheel member 40 may be adjusted in relation to the conveyor 16 by manipulation of the screw threaded member 56 or the particular force with which the wheel engages the conveyor 16 may be also regulated. It is seen that the bar 26 is disposed in angular relation to the upstanding members 22 wherein the flat surfaces of the bar 26 will be substantially perpendicular to the elongated rod 44 when the clod engaging wheel 40 is in its normal position.

In some instances it may be desirable to slightly raise the wheel 40 above the surface of the conveyor 16 and this can be easily accomplished by the obvious manipulation of the nuts 56 wherein the wheel 40 assumes a resilient floating condition. It will be seen that the wheels 40 are individually movable and the particular spacing arrangement may be changed as desired in the individual set ups. In practical operation, the conventional industrial tires have been used as the clod engaging wheels 40 and it will be obvious that other devices may be utilized and the particular number of wheel assemblies is determined by the individual conditions and the particular size of the conveyor on the potato harvester. The various elements of this invention may be constructed of conventional stock materials thereby assuring the reasonable production cost of the device of this invention. Further, it will be seen that the clod eliminator attachment 10 of this invention may be easily attached to or removed from the conventional potato harvester as the individual conditions require.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A clod eliminator for attachment to a potato harvester having a conveyor comprising a transverse supporting rod mounted in spaced relation to the potato carrying conveyor, an elongated bracket pivotally mounted on said rod, an axle positioned on one end of said bracket, a clod crushing wheel journaled on said axle, and means at the other end of said bracket to resiliently retain said wheel adjacent to the conveyor of a potato harvester, said resilient retaining means including a transverse bar mounted in spaced parallel relation to said rod, said bar having an aperture in alignment with said bracket, an elongated rod pivotally attached to the other end of the bracket and slidably received in said aperture, an independent spring mounted on each side of said bar and surrounding said rod, and means on each end of said rod in engagement with said spring for adjusting the tension on said springs and the angular relation of said bracket.

2. A clod eliminator for attachment to a potato harvester having a discharge conveyor comprising a transverse rod mounted in vertically spaced relation to said conveyor, a plurality of transversely spaced brackets independently pivotally mounted on said rod, a clod breaking wheel mounted on each bracket and positioned in resilient contact with said conveyor, and means for resiliently adjusting said bracket on said rod thereby adjusting the position of said wheel in relation to the conveyor, said resilient adjusting means including a transverse bar mounted in spaced parallel relation to said rod, said bar having an aperture in alignment with each of said brackets, an elongated rod pivotally attached to each of said brackets and slidably received within said apertures, an independent coil spring surrounding said elongated rod on each side of said bar and abutting opposite sides of said bar, and adjustable means adjacent remote ends of each of said elongated rod and engaging remote ends of said springs for adjusting the normal position of said wheels in relation to the conveyor, said wheels having a wide peripheral surface with the collective tread covering the major portion of the width of the conveyor.

3. A clod eliminator for attachment to a potato harvester having a discharge conveyor comprising a transverse rod mounted in vertically spaced relation to said conveyor, a plurality of transversely spaced brackets independently pivotally mounted on said rod, a clod breaking wheel mounted on each bracket and positioned for rolling contact with the load carrying surface of the conveyor for breaking clods disposed thereon, means for adjustably independently and resiliently urging said brackets pivotally about said rod for independently urging the wheels towards the load carrying surface of the conveyor for varying the crushing effect of the wheels thereby preventing crushing of potatoes, each of said wheels having a pneumatic tire thereon having a generally flat transverse peripheral tread surface with the collective tread width of the tires adapted to contact a major portion of the load carrying surface of the conveyor.

References Cited in the file of this patent

UNITED STATES PATENTS

| 340,103 | Courson | Apr. 20, 1886 |
| 1,331,722 | Remy | Feb. 24, 1920 |
| 1,621,739 | Parker | Mar. 22, 1927 |
| 2,014,060 | Albrecht | Sept. 10, 1935 |
| 2,177,026 | Nightenhelser et al. | Oct. 24, 1939 |
| 2,252,593 | Bruene | Aug. 12, 1941 |
| 2,582,872 | Krengel | Jan. 15, 1952 |

FOREIGN PATENTS

| 561,891 | France | Aug. 20, 1923 |